March 27, 1934.  G. A. HUMASON ET AL  1,952,170
SAMPLE TAKING APPARATUS
Filed May 27, 1932  2 Sheets-Sheet 1

Inventor
Granville A. Humason
James A. Logan.

By
Hardway Cathey
Attorneys

March 27, 1934.  G. A. HUMASON ET AL  1,952,170
SAMPLE TAKING APPARATUS
Filed May 27, 1932   2 Sheets-Sheet 2

Inventor
Granville A. Humason
James A. Logan.

By Hardway Cathey
Attorneys

Patented Mar. 27, 1934

1,952,170

UNITED STATES PATENT OFFICE 1,952,170

SAMPLE TAKING APPARATUS

Granville A. Humason and James A. Logan, Houston, Tex., assignors to Reed Roller Bit Company, Houston, Tex., a corporation of Texas Application May 27, 1932, Serial No. 613,882

12 Claims. (Cl. 255—72)

This invention relates to sample taking apparatus.

An object of the invention is to provide apparatus for taking samples of the formation being pierced in drilling wells.

Another object is to provide an apparatus of the character described adapted for taking cores, or samples, of either hard or soft formation.

Another object is to provide in a sample taking device novel means for excluding drilling fluid and other foreign matter from the core barrel while the apparatus is being lowered into the well.

A further object is to provide, in a sample taking device, a novel type of core catcher.

With the above and other objects in view this invention has particular relation to certain novel features of construction, operation and arrangement of parts, an example of which is given in this specification and illustrated in the accompanying drawings, wherein:—

Figure 1:
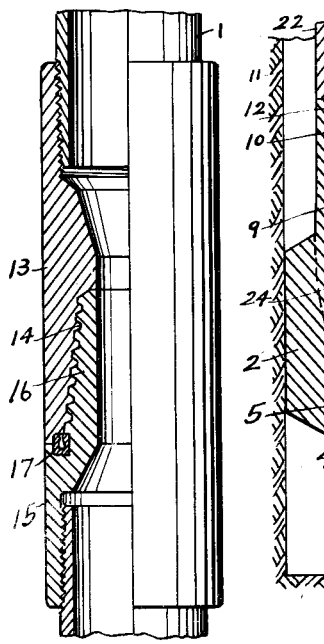
Figure 1 shows a side view of the upper end of the apparatus in position for taking a core, or sample.

Referring now more particularly to the drawings wherein like numerals of reference designate the same parts in each of the views the numeral 1 designates a tubular operating stem, as a whole, to the lower end of which any selected type of drill 2 may be secured, said drill, having a vertical, sample receiving opening 3 therein whose lower end may be reduced to provide the inside, annular shoulder 4. Seated on this shoulder there is a tubular core catcher which comprises the annular shell 5 having the spaced, upstanding fingers 6, formed of flexible material and whose upper ends may be inwardly curved, as at 7, and the tubular, resilient, inside sleeve 8 moulded in place and into which said shell and fingers are embedded. The fingers 6 are wide at their bases and taper to their pointed upper ends and the upper end of the resilient sleeve 8 is beveled upwardly and inwardly.

Figure 8:
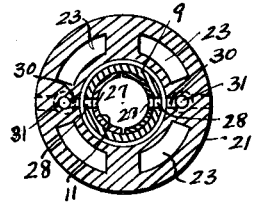
Figure 8 shows a cross sectional view taken on the line 8—8 of Figure 1.
Figure 9:
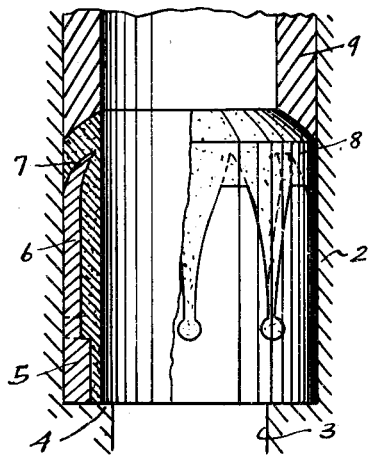
Figure 9 shows a side view, partly in section, of the core catcher.
Figure 10:
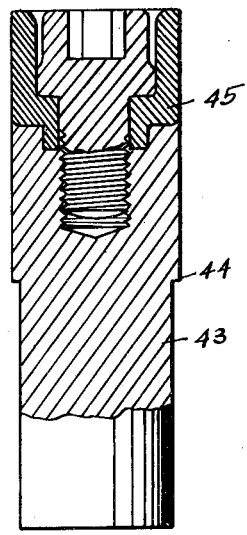
Figure 10 shows a sectional view of the closure plug employed.

Within and spaced from the operating stem 1 there is a core barrel 9 whose lower end is beveled to conform to the contour of, and which rests upon, the upper end of the sleeve 8. This barrel is formed of sections and the bottom section is connected to the section above by the reducing nipple 10. Above this nipple the barrel has an inside liner 11 whose lower end rests on an inside annular shoulder 12 in said nipple 10, and said liner extends up to the upper end of the barrel and is split into longitudinal sections, as shown in Figure 8, and for a purpose to be hereinafter explained. This liner has approximately the same inside diameter as that of the lower section of the barrel 9.

Incorporated into the operating stem there is a special type of tool joint having the upper box member 13 having an internally threaded box 14, and a lower, or pin member 15 having an externally threaded pin 16 screwed into said box. Between the pin and box members there is an annular packing 17. This packing has an annular groove 18 around its upper face in alignment with the joint between said pin and box and providing the outer and inner annular lips 19, 20 which will be pressed tightly against the opposing parts of the tool joint by the fluid which may leak through the joint between the pin and box and collect in said groove 18 and the further leakage of this fluid will be thereby prevented. Connected to the pin member 15, by a plain tubular section of the operating string, there is a tubular housing 21, forming part of the operating string and to the lower end of which the drill collar 22 is connected which, in turn, connects the drill 2 to the operating string. The intermediate portion of the housing 21 is thickened inwardly and said inwardly thickened portion has the vertical channels 23 therethrough to provide passageways for the drilling fluid which may be forced, by a pump at the ground surface, down through the operating string 1 and out through the ducts 24, of the drill, to the bottom of the bore. The liner 11 and barrel 9 have the upper and lower registering ports 25, 26 and 27, 28 which normally register also with the upper annular, inside channels 26', 28' in the housing and from which the upper and lower ducts 29, 30, lead into the vertical channels 31, 31 in said housing. These channels 31 are closed at their upper ends and their lower ends are enlarged, forming valve seats 32 controlled by the downwardly opening check valves as 33. The valves 33 are supported on and normally held seated by the coil springs 34 which in turn are supported by the plugs 35 which are screwed into, and close, the lower ends of the channels 31. Discharge ports 36, 37 lead out from the enlarged lower ends of the channels 31 beneath the valves 33.

Screwed into the upper end of the barrel 9 then is a sectional head 38 having an upwardly opening cup ring 39 clamped between the sections of said head and which fits closely within the housing 21. A collar 40 is secured around the head 38 by means of a frangible pin 41 and this collar normally rests on the upper end of the inwardly thickened portion of the housing 21, and a coupling 42, connecting sections of said barrel abuts the lower end of said inwardly thickened portion and said collar 40 and coupling 42 normally maintain the core barrel in its upper position and with the ports 25, 26 and 27, 28 aligned with the corresponding channels 26', 28'.

Figure 2:
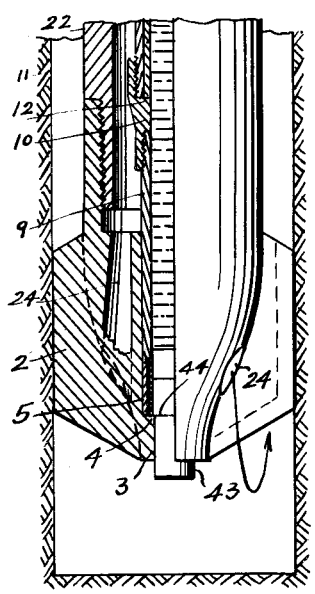
Figure 2 shows a similar view of the lower end thereof.
Figure 3:
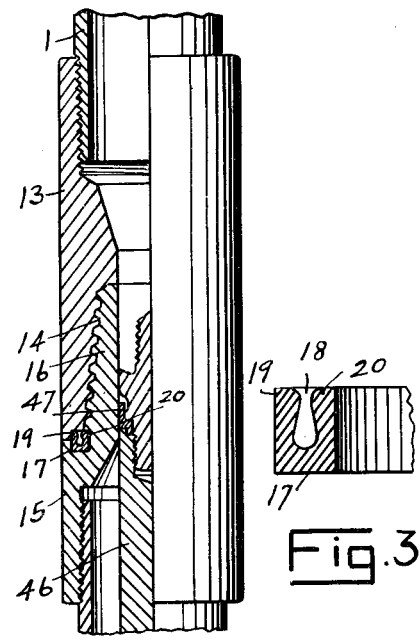
Figure 3 shows a fragmentary sectional view of a type of packing employed.
Figure 5:
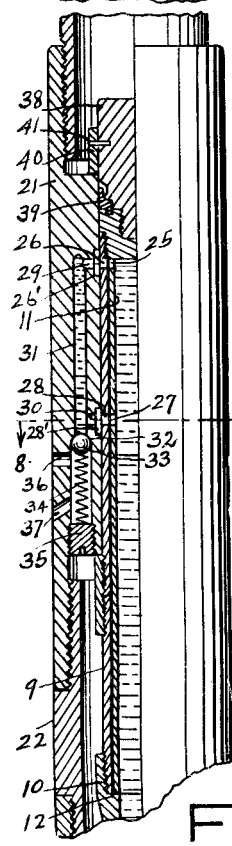
Figure 5 shows a similar view of the lower end thereof.
Figure 5:
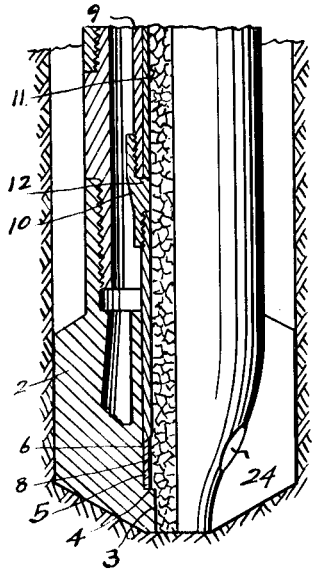
Figure 4:
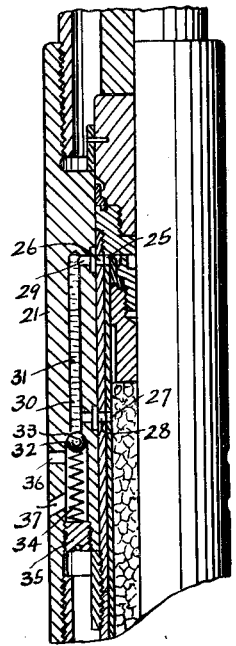
Figure 4 shows a side view, partly in section, of the upper portion of the apparatus showing the core therein and the parts in readiness to close the lower end of the barrel to retain the core therein.
Figure 6:
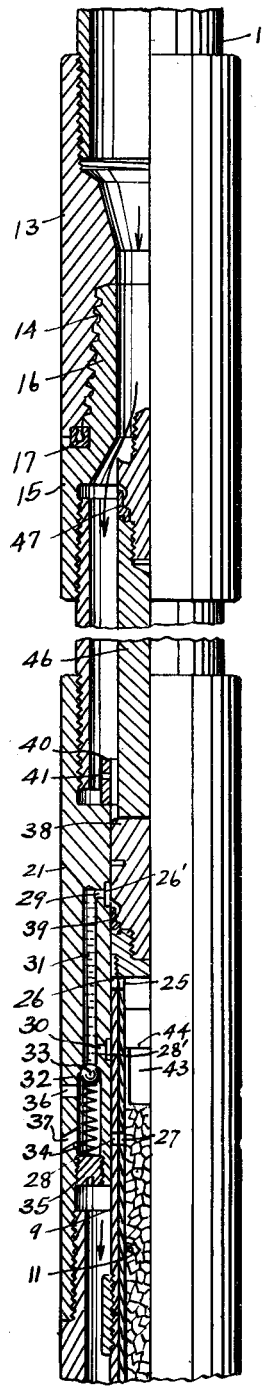
Figures 6 and 7 show side views, partly in section of the upper and lower ends respectively, of the apparatus in position to retain the core, or sample, taken.

When it is desired to take a core the apparatus may be assembled as shown in Figures 1 and 2 with the opening 3 closed by a plug, as 43. This plug 43 projects below the drill 2 and its upper end is enlarged forming an annular, external shoulder 44 which rests on the shoulder 4, and above the shoulder 44 the plug 43 has a surrounding, upwardly opening, cup ring 45 which fits closely within the core catcher. When the apparatus is thus assembled the core barrel is filled with clean fluid which is retained by the plug 43. The apparatus may now be let down into the bore to be tested until the plug 43 rests on the bottom of the bore. As the apparatus is lowered into the well the valve 33 and plug 43 will prevent the mud-laden drilling fluid in the well from entering the core barrel and filling the same with foreign matter to contaminate the sample taken later.

Drilling may now be proceeded with and as a core is formed it will gradually force the plug 43 upwardly through the core barrel, forcing the fluid in said barrel out through the ducts 29, 30, past the valves 33 and out through the ports 36, 37, and as the plug 43 is forced upwardly the core, or sample, will enter the core barrel from beneath. The plug 43 will finally land against the head 38 at the upper end of the core barrel closing the ports 25, 26 but clearing the ports 27, 28 thus permitting the escape of air, or liquid in the barrel between the plug 43 and the core, or sample.

Figure 7:
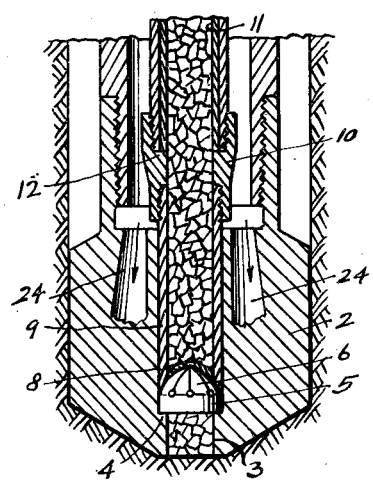

A plunger 46 may now be dropped through the operating string 1 and this plunger will land on the head 38. The plunger 46 has a surrounding, upwardly opening cup ring 47 which fits closely in the pin 16 of the tool joint member 15, and blocks the operating string 1. Fluid may now be forced down through the string 1 by a pump at the ground surface and applied, under pressure, against the plunger 46 and sufficient pressure will be built up to shear the pin 41 and thereupon the core barrel will be forced downwardly and the pressure of its lower end against the upper end of the core catcher will contract the upper end of the sleeve 8 and the upper ends of the fingers 6 and the core, if of soft formation, will be severed and the core catcher will be completely closed beneath the severed core, as shown in Figure 7, making a fluid tight seal and retaining the core, of soft or liquid formation, in said barrel. If the core is of hard formation the fingers 6 will be forced into it so as to sever it or so as to securely engage with it so that the core will be broken off and retained in the barrel upon an upward movement of the apparatus. When the core barrel is forced downwardly, as above explained, the ports 25, 26 and 27, 28 will move out of registration with the channels 26', 28' and the ducts 29, 30 and these ducts will be closed by the core barrel to the end that the drilling fluid in the bore can not enter the core barrel and contaminate the core, or sample therein.

When the plunger 46 and the core barrel beneath move downwardly, as above explained, the said plunger 46 will clear said tool joint and the pressure fluid from above may then circulate on down through the channels 23 and down around the core barrel and out through the ducts 24 and up around the operating string 1 to maintain circulation about said string.

The entire apparatus may now be withdrawn to the ground surface and broken up and the core barrel 9 removed. This barrel may then be disjointed and the liner 11 removed therefrom and its sections separated and access thus gained to the core or sample for the inspection of the same.

The drawings and description disclose what is now considered to be a preferred form of the invention by way of illustration only while the broad principle of the invention will be defined by the appended claims.

What we claim is:

1. A sample taking apparatus comprising an operating string of pipe, a drill thereon, a barrel in the string, a core catcher having upwardly directed serrations thereon beneath the barrel, means supporting said core catcher, the lower end of the barrel being shaped to operate against said serrations, upon the downward movement of the barrel, to force them inwardly to sever the core in the barrel and to close the lower end of said barrel.

2. A sample taking apparatus comprising an operating string of pipe, a drill thereon, a core barrel in the string, a core catcher support beneath the barrel, a core catcher on said support beneath the barrel formed with upwardly directed fingers and a resilient sleeve and operative upon a predetermined actuation of the barrel for severing a core contained within the barrel and for completely closing the lower end of the barrel to prevent escape of any portion of the core from the barrel.

3. In a sample taking apparatus a tubular core catcher comprising an annular shell having upwardly directed flexible fingers and a resilient sleeve supported by said shell and fingers.

4. In a sample taking apparatus a core catcher comprising a shell shaped to permit the passage of a core therethrough, yieldable fingers upstanding from the shell, a sleeve of resilient material shaped to conform to the shape of the shell supported on said shell and fingers.

5. A sample taking apparatus comprising a tubular operating string, a drill at the lower end of the string having an inlet for a core, a barrel in the string aligned with said inlet and closed at its upper end, said barrel having an upper and a lower outlet port and said string having an outlet channel communicating with said ports, a plug normally closing said inlet and movable by the pressure of the core entering the barrel into position to close the upper port and to clear the lower port.

6. A sample taking apparatus and comprising a tubular operating string, a drill at the lower end of the string having an inlet for a core, a barrel in the string aligned with said inlet and closed at its upper end, said barrel having an upper and a lower outlet port and said string having an outlet channel communicating with said ports, a plug normally closing said inlet and movable by the pressure of the core entering the barrel into position to close the upper port and to clear the lower port, and a check valve to control the flow of fluid through said channel.

7. A sample taking apparatus comprising an operating string, a drill at the lower end thereof having a core receiving inlet, a core receiving barrel in the string above said inlet, a core catcher supported beneath said barrel, frangible means for supporting said barrel in the string, and means through which fluid, under pressure, may be applied to the barrel to break said frangible means and to drive the barrel downwardly to actuate said core catcher into position to close the lower end of said barrel.

8. A sample taking apparatus comprising an operating string of pipe, a drill at the lower end thereof having a core receiving inlet, a core receiving barrel in the string above said inlet, a contractile core catcher supported beneath said barrel, frangible means for holding the barrel against downward movement in the string, means through which fluid, under pressure, may be applied to the barrel to break said frangible means and to force said barrel downwardly to effect the contraction of said core catcher.

9. A sample taking apparatus comprising a tubular operating string, a drill at the lower end of the string having an inlet for a core, a barrel in the string aligned with said inlet and closed at its upper end, said barrel having outlet ports and said string having an outlet channel communicating with said ports, a plug normally closing said inlet and movable by the pressure of the core entering the barrel into position to close one of said ports and to clear the other of said ports.

10. A sample taking apparatus comprising a tubular operating string; a drill at the lower end of the string having an inlet for a core; a core barrel in the string aligned with said inlet; a collapsible core catcher associated with said barrel; means to normally prevent said core barrel from collapsing said core catcher; said string, drill and barrel being constructed to provide a fluid channel to direct to said drill fluid pumped downwardly through said string; and a plug movable downwardly in said string to engage said core barrel and close said channel so that the pressure of the fluid in said string may be utilized to cause said barrel to collapse said catcher; said plug being constructed to open said channel when said core catcher is collapsed; said core barrel having therein an outlet opening having a relief valve therein; said opening being open before said core catcher is collapsed and closed when said core catcher is collapsed.

11. A sample taking apparatus comprising a tubular operating string; a drill at the lower end of the string having an inlet for a core; a core barrel in the string aligned with said inlet; a collapsible core catcher associated with said barrel; means to normally prevent said core barrel from collapsing said core catcher; said string, drill and barrel being constructed to provide a fluid channel to direct to said drill fluid pumped downwardly through said string; and a plug movable downwardly in said string to engage said core barrel and close said channel so that the pressure of the fluid in said string may be utilized to cause said barrel to collapse said catcher; said plug being constructed to open said channel when said core catcher is collapsed.

12. A sample taking apparatus comprising a tubular operating string; a drill at the lower end of the string having an inlet for a core; a core barrel in the string aligned with said inlet; a a collapsible core catcher associated with said barrel; means to normally prevent said core barrel from collapsing said core catcher; said string, drill and barrel being constructed to provide a fluid channel to direct to said drill fluid pumped downwardly through said string without permitting said fluid to enter said core barrel; and a plug movable downwardly in said string to engage said core barrel and close said channel so that the pressure of the fluid in said string may be utilized to cause said barrel to collapse said catcher.

GRANVILLE A. HUMASON.
JAMES A. LOGAN.